United States Patent
Zahid

[15] 3,695,298
[45] Oct. 3, 1972

[54] PRESSURE VESSEL
[72] Inventor: Abduz Zahid, Monterey Park, Calif.
[73] Assignee: Greer Hydraulics, Inc., Los Angeles, Calif.
[22] Filed: June 1, 1971
[21] Appl. No.: 148,523

[52] U.S. Cl. .................................................138/30
[51] Int. Cl. .............................................F16l 55/04
[58] Field of Search ...................138/30; 239/89, 96

[56] References Cited
UNITED STATES PATENTS

| | | |
|---|---|---|
| 3,168,907 | 2/1965 | Mercier........................138/30 |
| 3,319,420 | 5/1967 | Mercier....................138/30 X |
| 3,420,273 | 1/1969 | Greer...........................138/30 |
| 3,428,091 | 2/1969 | Sugimura......................138/30 |

*Primary Examiner*—Herbert F. Ross
*Attorney*—Arthur B. Colvin

[57] ABSTRACT

This invention relates to the art of pressure vessels, more particularly of the type using a deformable bladder having a cylindrical mouth of relatively large diameter to which is bonded a rigid annular retaining member, the latter having an annular groove in its outer periphery in which an O-ring is positioned to define a seal with respect to the side wall of the container in which the bladder is positioned.

10 Claims, 2 Drawing Figures

PATENTED OCT 3 1972

3,695,298

INVENTOR.
ABDUZ ZAHID

BY

ATTORNEY

PRESSURE VESSEL

As conducive to an understanding of the invention, it is to be noted that where a pressure vessel of the above type has a rigid cylindrical shell or container in which a metal retaining member is positioned, that is secured in fixed position adjacent one end of the container and a deformable partition such as a bladder of resilient stretchable material, illustratively of synthetic rubber, is positioned in said container with the periphery or mouth of the bladder secured to the retaining member, unless a dependable seal is formed between the periphery or mouth of the bladder and the retaining member and the adjacent container wall, leakage will occur with resultant failure of the unit.

Where the retaining member is secured to the container as by fusing or welding, although a dependable seal will be effected, it is apparent that in the event of failure of the bladder, it cannot be readily removed without first opening the fused or welded connection.

It is accordingly among the objects of the invention to provide a pressure vessel of the above type which may be readily fabricated at relatively low cost and which may readily be disassembled for removal of a defective bladder and readily reassembled with assurance that a dependable seal will be provided to prevent leakage of the fluid in the container to the exterior.

According to the invention these objects are accomplished by the arrangement and combination of elements hereinafter described and more particularly recited in the claims.

Figure 1:
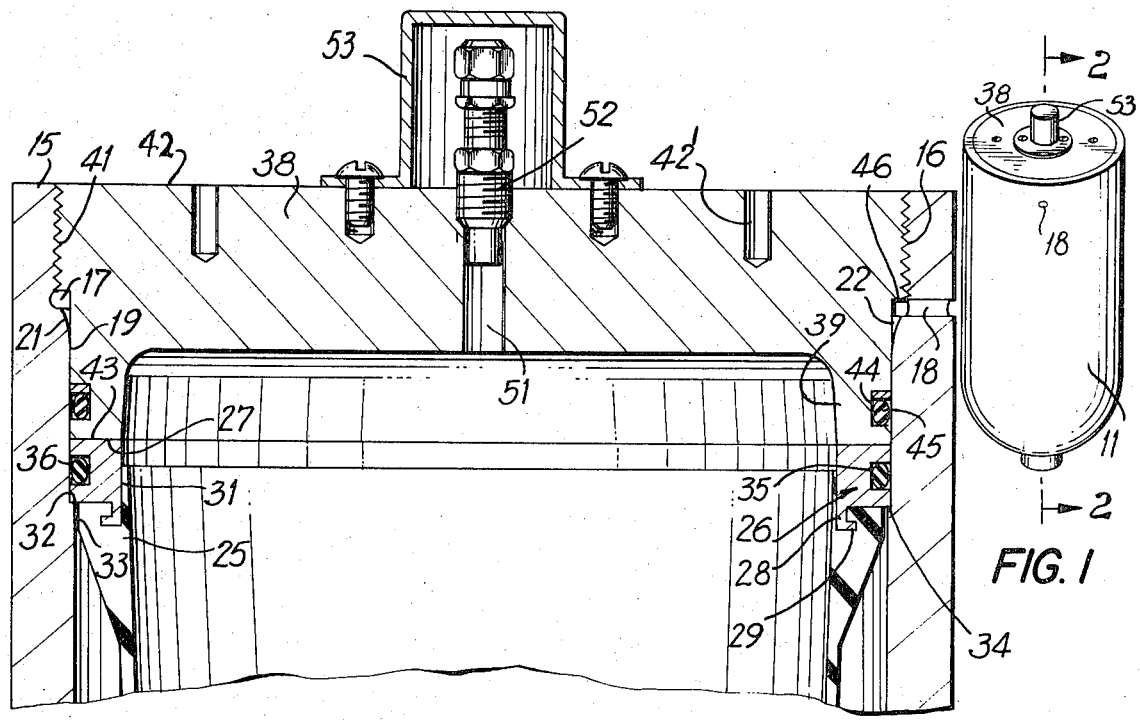
Figure 2:
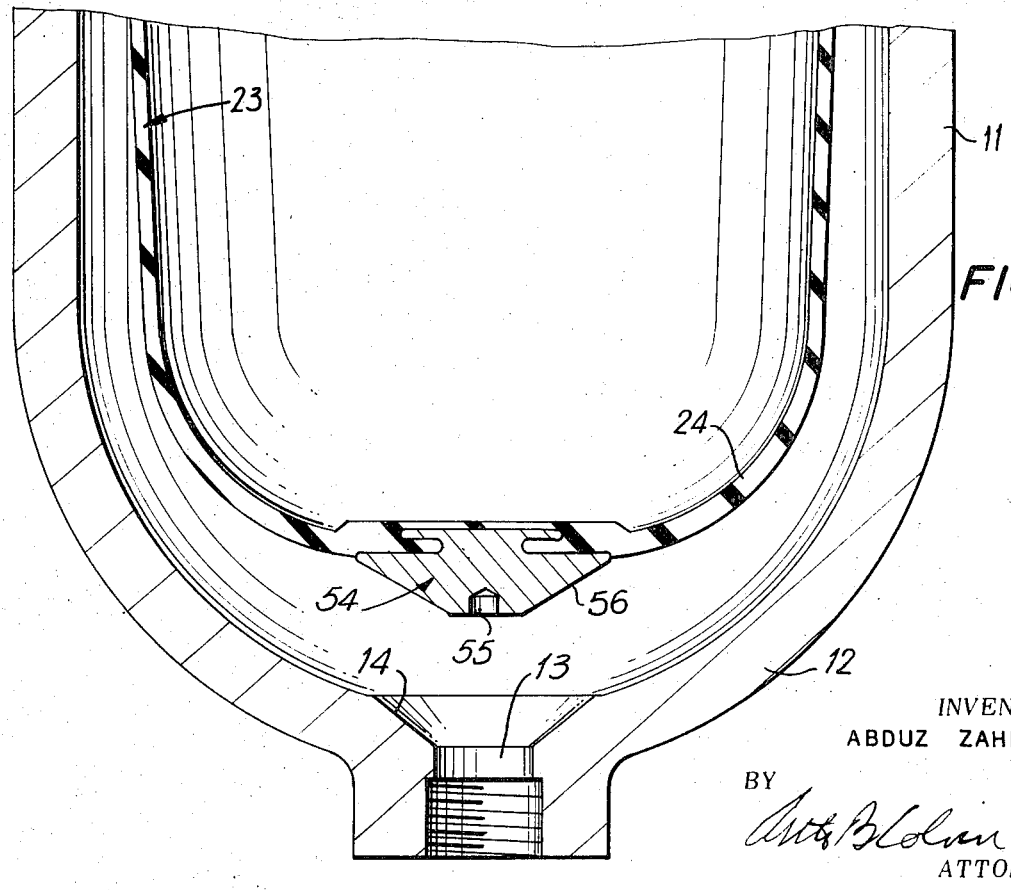

In the accompanying drawings in which are shown one of various possible embodiments of the several features of the invention;

FIG. 1 is a perspective view of a pressure vessel according to the invention, and FIG. 2 is a sectional view on a greatly enlarged scale with parts broken away taken along line 2—2 of FIG. 1.

Referring now to the drawings, the pressure vessel illustratively comprises a substantially cylindrical container 11 of rigid material such as steel or aluminum capable of withstanding the pressure to which it is to be subjected in use.

The container has one end closed as at 12 and such closed end has an axial port 13, the inner end 14 of which is beveled as shown to define a valve seat. The mouth 15 of the container is cylindrical as shown and the inner surface of the container adjacent the mouth 15 is threaded as at 16. An annular groove 17 is provided in the inner surface of the container adjacent the inner end of the threaded portion 16 and such annular groove 17 is in communication with the exterior of the unit through transverse passageway 18.

The inner diameter of the container is of lesser diameter than the diameter of the threaded portion 16 as is clearly shown at 19 and the annular portion of the inner surface of the container from the reduced diameter portion 19 to the annular groove 17 is beveled outwardly as at 21 to define an annular clearance 22, the function of which will be hereinafter described.

Position in the container 11 is a deformable partition illustratively in the form of an elongated bladder 23 of rubber or similar material having like characteristics. The bladder 23 is closed at one end as at 24 and the mouth 25 of the bladder which is of greater thickness than the remaining portion of the bladder is secured as by moulding to an annular supporting member 26 of rigid material, preferably of steel. By reason of the moulding of the bladder 23 to the annular supporting member 26, the bladder 23 will be securely bonded to such supporting member 26.

As is clearly shown in FIG. 2, the annular supporting member 26 is substantially rectangular in cross section, illustratively having a flat top wall 27 and a depending annular flange 28 with an outwardly extending lip 29 integral with its flat inner surface 31.

As a result of the foregoing construction, not only will the bonding of the thickened rim of the bladder to the annular supporting member retain the elements in juxtaposition, but the outwardly extending annular lip 29 will insure such retention.

It is to be noted that the transverse width of the annular supporting member is greater than that of the thickened rim 25 of the bladder so that as clearly shown in FIG. 2, the outer periphery 32 of the annular supporting member 26 will extend laterally outwardly of the outer periphery 33 of the thickened rim 25.

As is also clearly shown in FIG. 2, the inner diameter of the container is still further reduced to define an annular shoulder 34 which forms a seat for the outer periphery 32 of the annular supporting member 26 so that the bladder 23 will be dependably retained in desired position in the container.

The annular supporting member 26 has an annular groove 35 in its outer periphery in which an O-ring 36 is positioned, the function of the O-ring being to provide a seal as will hereinafter be described.

In order to retain the annular supporting member 26 and bladder 23 in position, a cylindrical cover member 38 is provided. As is clearly shown in the drawing, the cover member is substantially cup-shaped with its side wall or skirt 39 of outer diameter just slightly less than the diameter of the reduced portion 19 of the container so that the side wall 39 may readily be positioned in the container.

The cover member 38 adjacent its outer surface is of slightly enlarged diameter as at 41 and is externally threaded so that the cover member may be screwed into threaded mouth 16 of the container by means of a spanner wrench (not shown) applied to conventional bores 42' in the top surface of the cover member 38.

As is clearly shown in the drawings, when the cover member is screwed into the container so that the top surface 42 of the cover member is flush with the outer end 15 of the container, the inner end 43 of the side wall 39 of the cover member will abut against the top surface 27 of the annular supporting member 26 to retain the latter on the annular shoulder 32. The outer periphery of the side wall 39 of the cover member has an annular groove 44 in which an O-ring 45 is positioned to define a seal between the side wall 39 and the inner surface of the container.

It is to be noted that with the cover member screwed in place as shown in FIG. 2, the inner end 46 of the enlarged diameter portion 41 will be substantially aligned with the outer edge of the annular groove 17.

To complete the assembly, the cover member has an axial bore 51 in which a conventional gas charging valve 52 may be positioned, the latter having a removable cap 53 associated therewith to protect the charging valve 52.

Mounted on the closed end 24 of the bladder 23 and axially positioned with respect thereto, is a valve member 54 illustratively in the form of a button, preferably formed from steel or aluminum. The valve member is substantially frusto-conical in cross section with the smaller diameter portion or apex thereof having a guide recess 55 therein, which properly positions the valve member 54 with respect to the bladder 23 during the moulding operation. The side wall 56 of the valve member 54 is adapted to move against the beveled seat 14 to prevent extrusion of the bladder through the bore 13.

In initially assembling the unit, after the O-ring 36 is positioned in annular groove 35 of the annular supporting member 36 to which the bladder 23 is secured, the bladder and the supporting member are positioned in the open mouth of the container 11 so that the supporting member will seat on annular shoulder 34. Thereupon, the cover member 38 with the O-ring 45 positioned in annular groove 44 is screwed into the mouth of the bladder as a result of which the inner end 43 of the cover member 38 will abut against the top surface 27 of the supporting member to retain the latter on shoulder 34.

In conventional manner, the bladder 23 may be precharged with gas under pressure through valve 52 as a result of which the bladder will expand and the valve member 54 will move against seat 14 to prevent extrusion of the bladder. Thereafter, a valve (not shown) controlling port 13 may be opened to permit a source of oil under pressure to flow through port 13 to react against the bladder 23 to compress the gas contained therein.

In the event that it is desired to disassemble the pressure vessel above described, in order to replace the bladder 23 for example, the workman should first properly relieve the pressure by opening valve 52. However, in the event that the workman should fail to take this precaution or due to malfunctioning of the valve, pressure should still remain in the container, it is to be noted that as the cover is rotated and is moved outwardly from the threaded portion 16 of the container, when approximately 50 percent of the threaded portion of the cover member has been moved clear of the threaded portion 16, the O-ring 45 will be aligned with the lower edge of the annular clearance 22 so that with slight further outward movement of the cover member while the threads are still dependably engaged, the O-ring will lose its sealing effect by reason of its movement into the annular clearance 22 so that the pressure in the container will be vented through passageway 18 to the exterior.

As a result of this arrangement, blowout of the cover member due to pressure in the container is precluded as the pressure will be relieved before the the cover member is completely unscrewed and while a sufficient portion of the threads of the cover member engage the threads of the container to prevent stripping of such threads.

By reason of the O-ring 36 in the annular supporting member 26, precise tolerance does not have to be provided between the outer periphery of the supporting member 26 and the inner surface of the container. Thus, the O-ring as a result of pressure in the container will tend to be forced upwardly in conventional manner to form a seal. The same action occurs with the O-ring 45 and hence as a result of the relatively simple construction herein described, a pressure vessel is provided which may be fabricated at low cost and which will permit ready replacement of a defective bladder.

Having thus described my invention, what I claim as new and desire to secure by Letters Patent of the United States is:

1. A pressure vessel comprising a rigid hollow container having a cylindrical opening at one end defining the mouth of the container and having a port at its other end, a bladder of resilient deformable material in said container, said bladder having a mouth at one end and being closed at its other end and intervening between said opening and said port, annular shoulder mounting means in said container wall an annular supporting member of rigid material contacting said shoulder and having a cylindrical outer periphery with an annular groove therein and a bottom surface to which the mouth of the bladder is bonded, said annular shoulder releasably supporting said annular supporting member, an O-ring positioned in said annular groove to define a seal with respect to the adjacent wall surface of the container, a cover member having a port positioned in said opening, said cover member having a depending annular side wall defining a cylindrical skirt, and means releasably to retain said cover member in fixed position in said opening with the inner edge of said skirt contacting and abutting against said annular retaining member to retain the latter on said mounting means.

2. The combination set forth in claim 1 in which said annular skirt is of outer diameter just slightly less than the inner diameter of the container, said skirt having an annular groove therein and an O-ring is positioned in said annular groove to define a seal with respect to the adjacent wall surface of the container.

3. The combination set forth in claim 1 in which a portion of said container has a reduced inner diameter defining an annular shoulder which forms said mounting means, and the outer periphery of said annular supporting member adjacent its bottom surface is seated on said shoulder.

4. The combination set forth in claim 1 in which the mouth of said bladder has a thickened portion, and the outer diameter of said annular supporting member is greater than the outer diameter of the thickened mouth portion of said bladder, whereby the bottom surface of said annular supporting member adjacent its outer periphery will extend laterally beyond the outer periphery of the thickened portion of said bladder to define an annular supporting surface, a portion of said container having a reduced inner diameter defining an annular shoulder which forms said mounting means, said annular supporting surface sealing on said annular shoulder.

5. The combination set forth in claim 1 in which the mouth of said bladder has a thickened portion, said annular supporting member is rectangular in cross section having a cylindrical inner periphery with a depending annular flange having an outwardly extending annular lip at its free end, the mouth of said bladder being bonded to the bottom surface of said annular supporting member and to said annular flange and annular lip.

6. The combination set forth in claim 5 in which the mouth of said bladder is molded to said annular supporting member.

7. The combination set forth in claim 1 in which said container is internally threaded at the mouth thereof and said cover member is a cylindrical disc having an externally threaded periphery to coact with the threaded mouth of the container releasably to retain the cover member in fixed position.

8. The combination set forth in claim 1 in which the portion of said container adjacent the mouth thereof is of enlarged diameter and is internally threaded, an internal annular groove is formed in the container wall adjacent the inner end of the threaded enlarged diameter portion of the container, a passageway having one end in communication with said annular groove extends through said container wall, said cover member is a cylindrical disc having an externally threaded outer periphery adapted to coact with the threaded portion of the container releasably to retain the cover member in fixed position, said cylindrical depending skirt being of outer diameter less than that of the disc and said skirt having an annular groove therein and an O-ring is positioned in said annular groove to define a seal with respect to the adjacent side wall of the container, said annular groove extending inwardly into said container beyond said annular groove in the wall of the container when the cover member is in fixed position.

9. The combination set forth in claim 8 in which the portion of the inner surface of the container wall extending inwardly of the inner edge of the annular groove in the container wall is bevelled to define a tri-angular clearance space, having its apex directed inwardly, between the outer surface of the skirt and the inner surface of the container wall.

10. The combination set forth in claim 1 in which the inner surface of the port in said container is bevelled to define a valve seat and the closed end of the bladder has a closure valve axially secured thereto and having a bevelled side wall adapted to seat on said valve seat.

* * * * *